(12) United States Patent
Vullers et al.

(10) Patent No.: US 8,447,238 B2
(45) Date of Patent: May 21, 2013

(54) RF TRANSMITTER DEVICE AND METHOD FOR OPERATING THE SAME

(75) Inventors: Ruud Vullers, Waalre (NL); Hubregt Jannis Visser, Veldhoven (NL)

(73) Assignee: Stichting IMEC Nederland, Eindhoven (NL)

( * ) Notice: Subject to any disclaimer, the term of this patent is extended or adjusted under 35 U.S.C. 154(b) by 147 days.

(21) Appl. No.: 12/841,929

(22) Filed: Jul. 22, 2010

(65) Prior Publication Data

US 2011/0021160 A1   Jan. 27, 2011

Related U.S. Application Data

(60) Provisional application No. 61/228,483, filed on Jul. 24, 2009.

(51) Int. Cl.
*H04B 1/00* (2006.01)

(52) U.S. Cl.
USPC .................. 455/68; 455/522; 455/69; 455/70

(58) Field of Classification Search
USPC ............ 455/68, 69, 522, 67.11, 552.1, 404.2, 455/9, 13.4, 41.2, 41.1, 572, 573, 574, 115.1, 455/127.1, 177.1, 343.5, 343.2, 456.1, 343.1, 455/70; 320/108; 342/357.25; 307/9.1, 104; 340/572.1, 10.1, 5.1, 522; 714/22
See application file for complete search history.

(56) References Cited

U.S. PATENT DOCUMENTS

| | | | | |
|---|---|---|---|---|
| 5,252,979 | A * | 10/1993 | Nysen | 342/50 |
| 8,018,335 | B2 * | 9/2011 | Jung et al. | 340/539.13 |
| 2004/0078662 | A1 * | 4/2004 | Hamel et al. | 714/22 |
| 2005/0218870 | A1 * | 10/2005 | Lys | 323/222 |
| 2006/0103534 | A1 * | 5/2006 | Arms et al. | 340/572.1 |
| 2006/0113955 | A1 * | 6/2006 | Nunally | 320/108 |
| 2007/0114422 | A1 * | 5/2007 | Berkcan et al. | 250/358.1 |
| 2007/0178945 | A1 * | 8/2007 | Cook et al. | 455/572 |
| 2007/0262863 | A1 * | 11/2007 | Aritsuka et al. | 340/539.22 |
| 2007/0298846 | A1 * | 12/2007 | Greene et al. | 455/572 |
| 2008/0094212 | A1 * | 4/2008 | Breed | 340/541 |
| 2008/0167573 | A1 * | 7/2008 | Stivoric et al. | 600/549 |
| 2009/0189739 | A1 * | 7/2009 | Wang | 340/10.1 |
| 2009/0243397 | A1 * | 10/2009 | Cook et al. | 307/104 |
| 2009/0251545 | A1 * | 10/2009 | Shekarri et al. | 348/158 |
| 2009/0322510 | A1 * | 12/2009 | Berger et al. | 340/539.1 |
| 2009/0322557 | A1 * | 12/2009 | Robb et al. | 340/870.3 |
| 2010/0123560 | A1 * | 5/2010 | Nix et al. | 340/10.4 |
| 2010/0181961 | A1 * | 7/2010 | Novak et al. | 320/108 |
| 2010/0225272 | A1 * | 9/2010 | Kirby et al. | 320/108 |
| 2010/0284674 | A1 * | 11/2010 | Hanuska et al. | 396/56 |
| 2011/0010106 | A1 * | 1/2011 | Katsukura et al. | 702/19 |

(Continued)

OTHER PUBLICATIONS

Guidelines for Limiting Exposure to Time-Varying Electric, Magnetic, and Electromagnetic Fields (Up to 300 GHz), Health Physics, vol. 75, No. 4, Apr. 1998, pp. 494-522.

*Primary Examiner* — Tan Trinh (74) *Attorney, Agent, or Firm* — Knobbe Martens Olson & Bear LLP (57) ABSTRACT

A radio frequency (RF) transmitter device arranged for supplying RF energy is disclosed. In one aspect, the RF transmitter device has a reception unit for receiving information on detected living beings. The RF transmitter device is arranged for adapting its transmit power according to the received information. A method for adapting the transmit power of the RF transmitter device while it is supplying energy to a sensor network is also disclosed.

15 Claims, 8 Drawing Sheets

U.S. PATENT DOCUMENTS

2011/0018679 A1* 1/2011 Davis et al. .................. 340/3.1
2011/0050166 A1* 3/2011 Cook et al. .................. 320/108
2011/0090888 A1* 4/2011 Arms et al. .................. 370/338
2011/0126222 A1* 5/2011 Wright et al. .................. 725/14
2012/0007441 A1* 1/2012 John .................. 307/104
2012/0041604 A1* 2/2012 Isaksson et al. .............. 700/277

* cited by examiner

RF TRANSMITTER DEVICE AND METHOD FOR OPERATING THE SAME

CROSS REFERENCE TO RELATED APPLICATIONS

This application claims priority under 35 U.S.C. §119(e) to U.S. provisional patent application 61/228,483 filed on Jul. 24, 2009, which application is hereby incorporated by reference in its entirety.

BACKGROUND OF THE INVENTION

1. Field of the Invention

The present invention generally relates to a radio frequency transmitter device and a method for adapting its transmit power.

2. Description of the Related Technology

Next generation sensor networks are powered by energy harvesting techniques, thus getting rid of batteries. Energy harvesting (also known as power harvesting or energy scavenging) is the process by which energy is derived from external sources (e.g., solar power, thermal energy, wind energy, salinity gradients, and kinetic energy), captured and stored.

Figure 1:
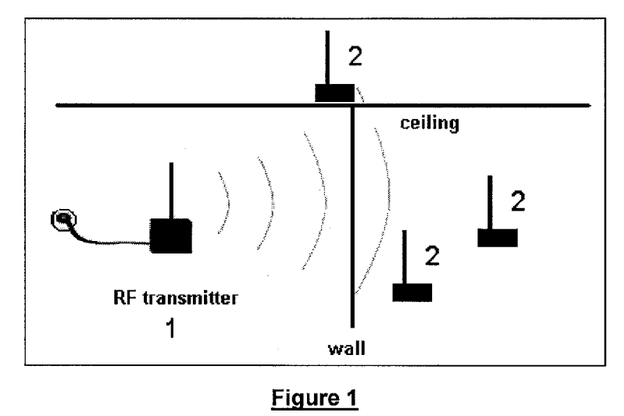
FIG. 1 illustrates a RF powered sensor network as known in the art.

Among the various harvesting options photovoltaic and RF are the most promising ones. With RF harvesting actually a wireless energy transfer is meant, where the source of energy is a transmitting device (1), designed especially for this purpose and placed in close proximity of devices with RF power harvesting (2) (see FIG. 1). The maximum distance between the detector or sensor and the RF source depends on the transmitted power.

The International Commission on Non-Ionizing Radiation Protection (ICNIRP) has issued guidelines for limiting exposure to time-varying electric, magnetic and electromagnetic fields up to 300 GHz in "Guidelines for Limiting Exposure to Time-Varying Electric, Magnetic and Electromagnetic Fields (up to 300 GHz)" (*Health Physics*, Vol. 74, No. 4, April 1998, pp. 494-522). Following these guidelines provides protection against known adverse health effects. An adverse health effect causes detectable impairment of the health of the exposed individual or of his/her offspring. A biological effect, on the other hand, may or may not result in an adverse health effect.

It is important that the recommended levels not be exceeded, especially in public spaces, like office buildings, where sensor/detector networks are commonly used. The maximum power that can be transmitted poses an upper limit to the distance between the transmitter and the detector and/or to the maximum power that can be used by the detector and/or to the minimum time needed to transfer a required amount of energy. These restrictions also limit the possible time instances that the RF transmitters may send wireless energy for powering up the sensor/detector network.

Hence, a need arises for devices and method that allow a safe energy transfer towards a sensor or a network of sensors, whereby the energy levels prescribed for safe transmission in the presence of living beings are respected.

SUMMARY OF CERTAIN INVENTIVE ASPECTS

Certain inventive aspects relate to a radio frequency (RF) transmitter device and a network of such devices. One aspect also relates to powering up a network of sensors and/or detectors by wireless RF harvesting without exposure of any living being to RF energy levels exceeding the ICNIRP guidelines. Such a wireless sensor and/or detector network may for example be present in a public area, like an office building. More in particular, one aspect relates to a method for reducing or removing the exposure to the power transmitted by RF transmitters for powering up the sensor network.

In a first aspect the invention discloses a RF transmitter device arranged for supplying RF energy. The RF transmitter device comprises receiver arranged for receiving information on detected living beings. The transmitter device is capable of adapting its transmit power according to the received information.

Due to the received information concerning the presence of living beings as detected by the sensing means the transmitter is capable of adjusting its transmission levels accordingly, such that if there is presence the prescribed safety levels are respected and in case there is no presence energy transmission is performed at higher levels so that a faster energy supply is obtained.

In an embodiment, the RF transmitter is arranged for identifying the sensor (detector) from which the information on detected living beings was received. In practice often more than one sensor for presence detection is used. This information is then exploited in determining how much the energy level is to be lowered.

One inventive aspect also relates to a network of RF transmitters as previously described. In an embodiment the RF transmitters are arranged for communication with each other.

One inventive aspect relates further to an assembly of at least one sensing device arranged for detecting living beings and at least one RF transmitter device as described, whereby the sensing device is further arranged for communication with the at least one RF transmitter, so that information on living beings detected by the sensing device can be exchanged. Advantageously, the at least one sensing device is part of a sensor network.

At least one sensing device of the network should indeed be capable of operating as a presence detector arranged for detecting human beings and/or animals. The presence detector sends a signal to the transmitter whenever a human being is detected. If no human being is present within the reach of the transmitter, the power transmitted may exceed the maximum power as determined by health regulations. As soon as a human being is detected, the power transmission decreases towards a level lower than determined by health regulations.

In an alternative embodiment, the energy transmitters of several sensor networks form a network. A transmitter of a first network sends a signal to the transmitter of a neighboring network in case of human presence. Since transmitters are connected to the mains, there is no real power limit for its radio: it does not have to be very energy efficient, contrary to the radio of the sensor. In another embodiment, the sensors are only charged during periods when there is no presence at all.

In another aspect the invention relates to a method for adapting the transmit power of a RF transmitter device used for supplying RF energy to a plurality of sensing means. The method comprises detecting with a sensing device the presence of a living being, transmitting information on the detection to the RF transmitter device, and adapting the transmit power of the RF transmitter device according to this information.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION OF CERTAIN ILLUSTRATIVE EMBODIMENTS

The present invention will be described with respect to particular embodiments and with reference to certain drawings but the invention is not limited thereto. The drawings described are only schematic and are non-limiting. In the drawings, the size of some of the elements may be exaggerated and not drawn to scale for illustrative purposes. The dimensions and the relative dimensions do not necessarily correspond to actual reductions to practice of the invention.

Furthermore, the terms first, second, third and the like in the description, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description are used for descriptive purposes and not necessarily for describing relative positions. The terms so used are interchangeable under appropriate circumstances and the embodiments of the invention described herein can operate in other orientations than described or illustrated herein.

The term "comprising", should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting of only components A and B. It means that with respect to the present invention, the only relevant components of the device are A and B.

The maximum distance between the detector (i.e. sensor of the sensor network) and the RF source depends on the transmitted power. This can be described using Friis transmission equation $$P_R = P_T \frac{G_T G_R \lambda^2}{(4\pi)^2 R^2} \quad (1)$$

wherein $P_R$ is the received power, $P_T$ the transmitted power, $G_T$ the gain of the transmit antenna, $G_R$ the gain of the receive antenna, $\lambda$ the wavelength used and R the distance between transmit and receive antenna.

Tables 1 and 2 illustrate how the received power varies for several distances (2 m, 5 m and 10 m) from a source transmitting a maximum allowed Effective Isotropic Radiated Power (EIRP, EIRP=$P_T G_T$), for frequencies 2.45 GHz and 868 MHz, respectively. For both frequencies a half-wavelength dipole receive antenna is assumed with $G_R$=1.64.

TABLE 1

| EIRP | $P_R$, R = 10 m | $P_R$, R = 5 m | $P_R$, R = 2 m |
| --- | --- | --- | --- |
| 0.0164 W | 0.025 µW | 0.10 µW | 0.64 µW |
| 0.1000 W | 0.16 µW | 0.62 µW | 3.90 µW |
| 4.0000 W | 6.24 µW | 24.96 µW | 156.00 µW |

TABLE 2

| EIRP | $P_R$, R = 10 m | $P_R$, R = 5 m | $P_R$, R = 2 m |
| --- | --- | --- | --- |
| 0.82 W | 10.17 µW | 40.67 µW | 254.20 µW |
| 3.28 W | 40.67 µW | 162.69 µW | 1016.80 µW |

The exposure limits to time-varying electric, magnetic and electromagnetic fields up to 300 GHz are given by the already mentioned International Commission on Non-Ionizing Radiation Protection (ICNIRP) guidelines. These guidelines are used for comparison with the power restrictions in the ISM frequency bands. National guidelines may be less strict than the ICNIRP guidelines. The ICNIRP exposure limits, for frequencies relevant for rectenna operation, are stated in Table 3. Note that a rectenna (i.e. antenna including a rectifier) is used to directly convert microwave energy into DC electricity: it receives and rectifies the RF waves and produces direct current ("DC") power. Rectenna elements are usually arranged in a multi element phased array with a mesh pattern reflector element to make it directional. The DC power produced by the rectenna is dependent on rectenna design, RF wave frequency, RF wave polarization and RF wave power level incident at the rectenna.

TABLE 3

| Frequency Range | Plane Wave Power Density, S (Wm$^{-2}$) | |
| --- | --- | --- |
| 10-400 MHz | Occupational exposure | 10 |
| | General public exposure | 2 |
| 400-2000 MHz | Occupational exposure | f/40 (f: freq. in MHz) |
| | General public exposure | f/200 (f: freq. in MHz) |
| 2-300 GHz | Occupational exposure | 50 |
| | General public exposure | 10 |

With occupational exposure is meant exposure to time-varying electromagnetic fields as a consequence of a particular occupation. Such exposure by people trained to be aware of potential risk and to take appropriate precautions, usually occurs under known conditions. The general public on the contrary comprises individuals of all ages and of varying health status. Members of the public are often unaware of their exposure to EMF. Therefore more stringent exposure restrictions are adopted for the public.

The power density at a distance R from a transmitter, is given by $$S = \frac{P_T G_T}{4\pi R^2} = \frac{EIRP}{4\pi R^2} \quad (2)$$

The minimum allowed distance to a transmit antenna may thus be calculated to be $$R_{min} = \sqrt{\frac{EIRP}{4\pi S_{max}}} \quad (3)$$

where the EIRP (Equivalent Isotropically Radiated Power) values may be found in Tables 1 to 2 and the power density values may be found in Table 3.

As an example, consider a frequency of 2.45 GHz, allowing an EIRP peak power of 4 Watt (see Table 1). From Table 3 can be derived that for a frequency of 2.45 GHz, the general public exposure limit is 10 Wm$^{-2}$. Then, equation (3) gives for the minimum allowed distance from the transmit antenna: $R_{min} = \{4 \cdot 0/(4\pi \cdot 10)\}^{1/2}$ meter or 17.8 cm.

As already mentioned, the power that can be transmitted is upper bounded by legal and health regulations that indicate the maximum power level to which a human being can be exposed. Especially in public spaces like where RF harvesting techniques are employed for powering up sensor/detector networks like for example office buildings, it is important that these levels not be exceeded. The maximum power that can be transmitted imposes a maximum distance between the receiver and the detector and/or the maximum power that can be used by the detector and/or the minimum time needed to transfer a given amount of energy. These restrictions also limit the time instances the transmitters can send energy for powering up the sensors/detectors in the network.

In some periods of time (e.g. at night) or in specific places in the building (shielded stock rooms), no persons are present. In this case one does not have to use the limits of general public exposure (see Table 3), but one can go at least a factor about five times higher in power. In one embodiment, this factor of 5 in power has the following advantages:

for the same power received a 2.2 times larger distance can be used for the distance between sensor and beacon.

for the same distance 5 times more power can be transmitted and received. So a battery can be recharged 5 times faster.

Certain embodiments provide a mechanism for efficiently powering up a sensor/detector network by RF energy harvesting techniques, thereby respecting the limits of general public exposure. The proposed technique is preferably applicable when a wireless sensor node network is present whereby at least one or some (or even all) of these sensors are capable of acting as presence detectors and whereby the sensors are powered by RF harvesting. The detectors send a signal to the RF transmitter(s) whenever a human being is detected. If no human being is present within the reach of the transmitter, the power transmitted may exceed the maximum power as determined by health regulations. As soon as a human being is detected, the power transmissions are decreased towards levels lower than determined by the health regulations.

Figure 2A:
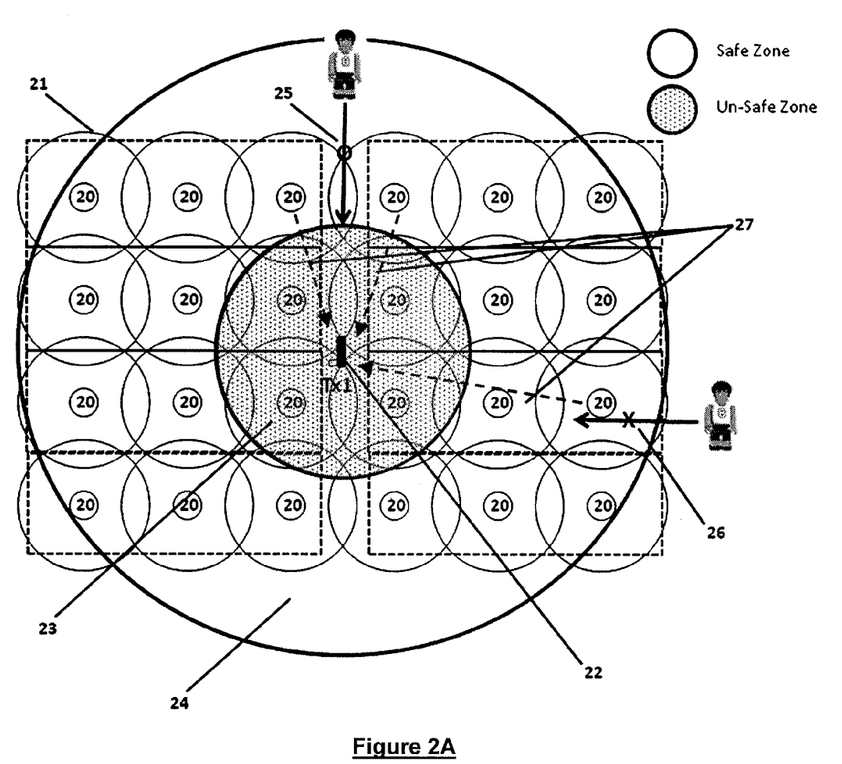
FIG. 2 illustrates an embodiment of the solution.
Figure 2B:
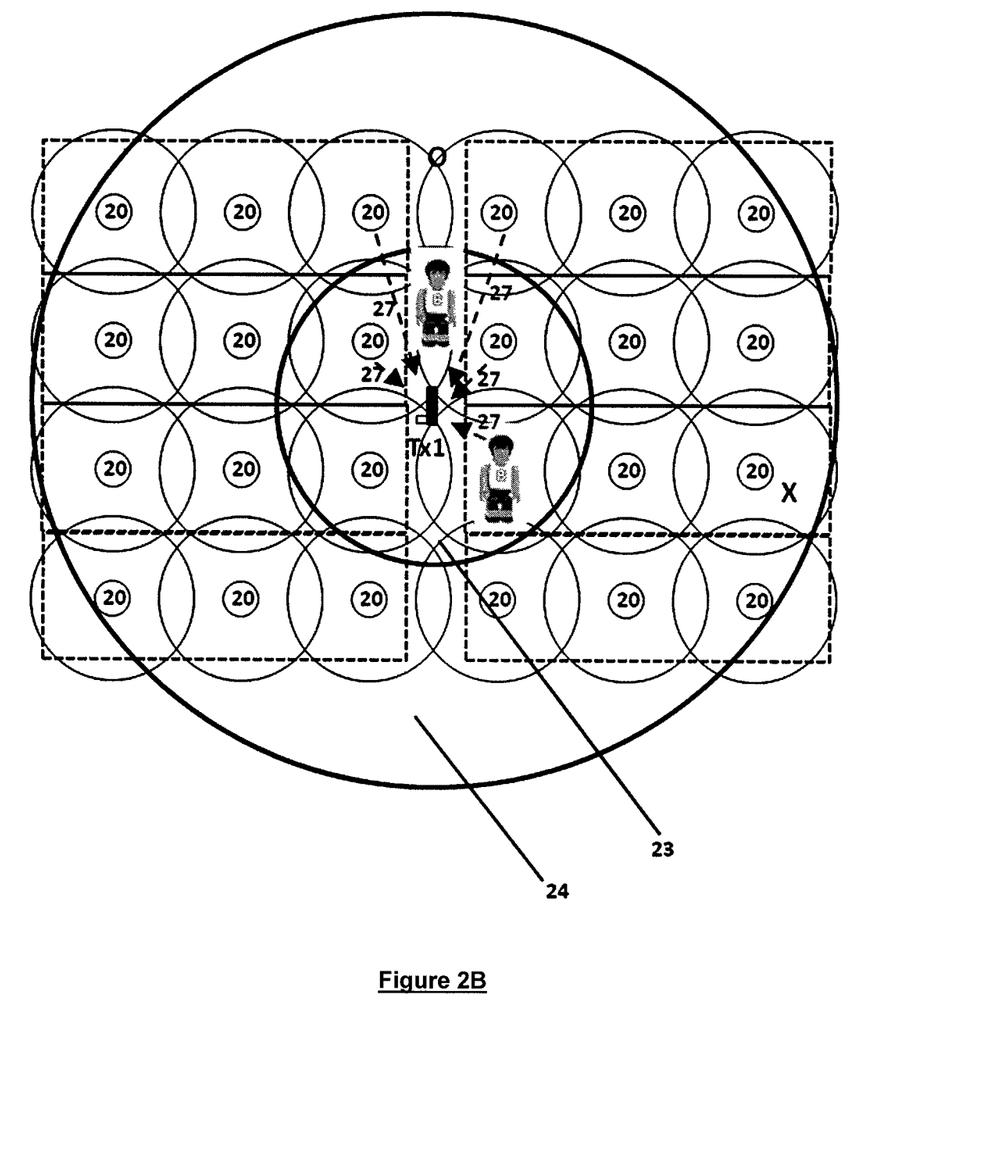

The principle is sketched in FIG. 2. A sensor (20) to detect presence is indicated by a circle. The area to be covered is indicated by the dotted rectangle (21). Two power levels of the transmitter (Tx1) (22) are indicated by the circles (23) and (24), respectively, whereby of course the level corresponding to circle (24) is below that of circle (23). In FIG. 2A the transmitter transmits in the inner circle (23) above the maximum health level, while in the outer circle (24), the transmission energy is lower and acceptable for human beings. In FIG. 2B in both the inner (23) and outer circle (24) the transmission level has dropped the allowed power level. In FIG. 2A the power transmitted is in some areas larger than the allowed power levels and human beings are approaching this zone (indicated with arrow). Both are detected as soon as they pass position O (25) or X (26). The presence detectors (20) send a signal (27) (indicated with dotted line) to the RF transmitter device. Subsequently, the power level of the transmitter is reduced in order to let the human beings enter the zone near the transmitter (23) (FIG. 2B). Presence information is converted into a digital signal indicating presence and identifying the sensor. Based on the presence signal the transmitter power is lowered. Based on the sensor identification, the amount of lowering is determined.

In another embodiment, the energy transmitters themselves form a network. In this case, not only the sensors within their own reach can sense the presence of a human being, but also neighboring presence networks. The principle is sketched in FIG. 3. Here the situation is shown in case of two networks, network 1 comprising a first transmitter Tx1 (22) associated with sensors (20) and network 2 comprising a second transmitter Tx2 (32) associated with sensors (30).

Figure 3A:
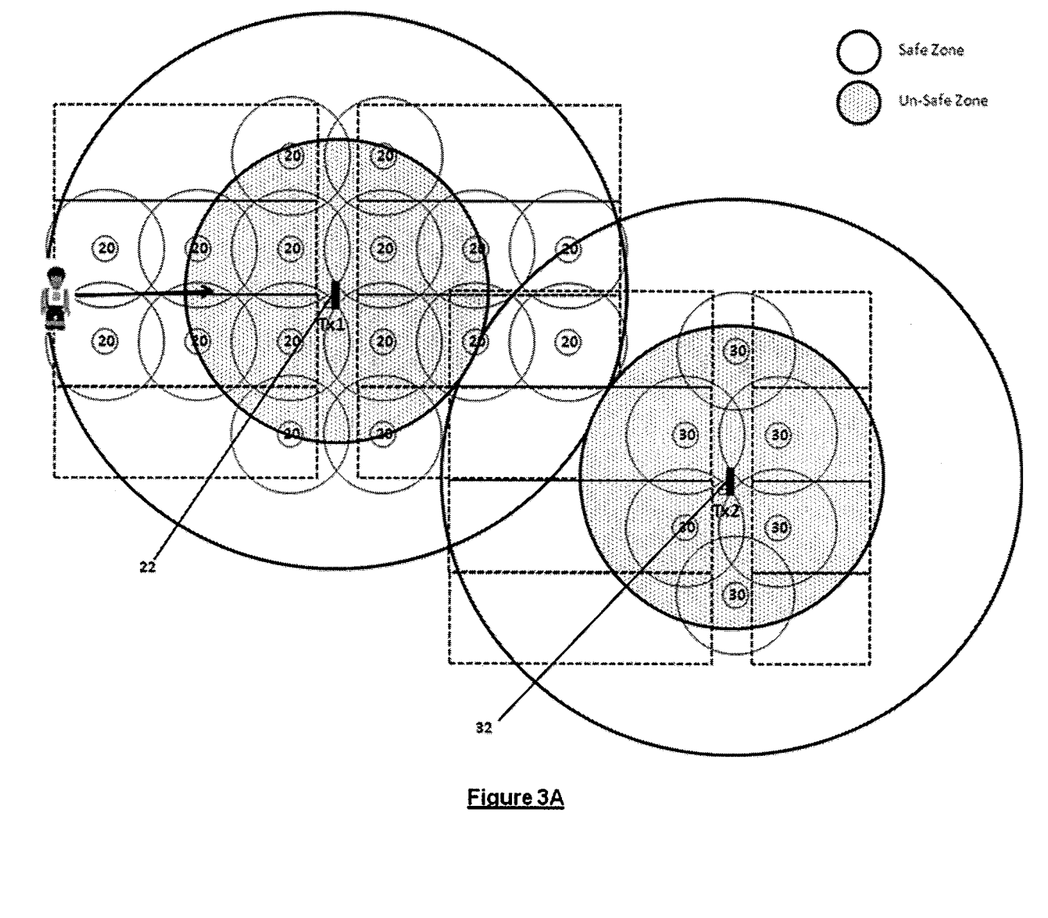
FIG. 3 illustrates an embodiment of the method.
Figure 3B:
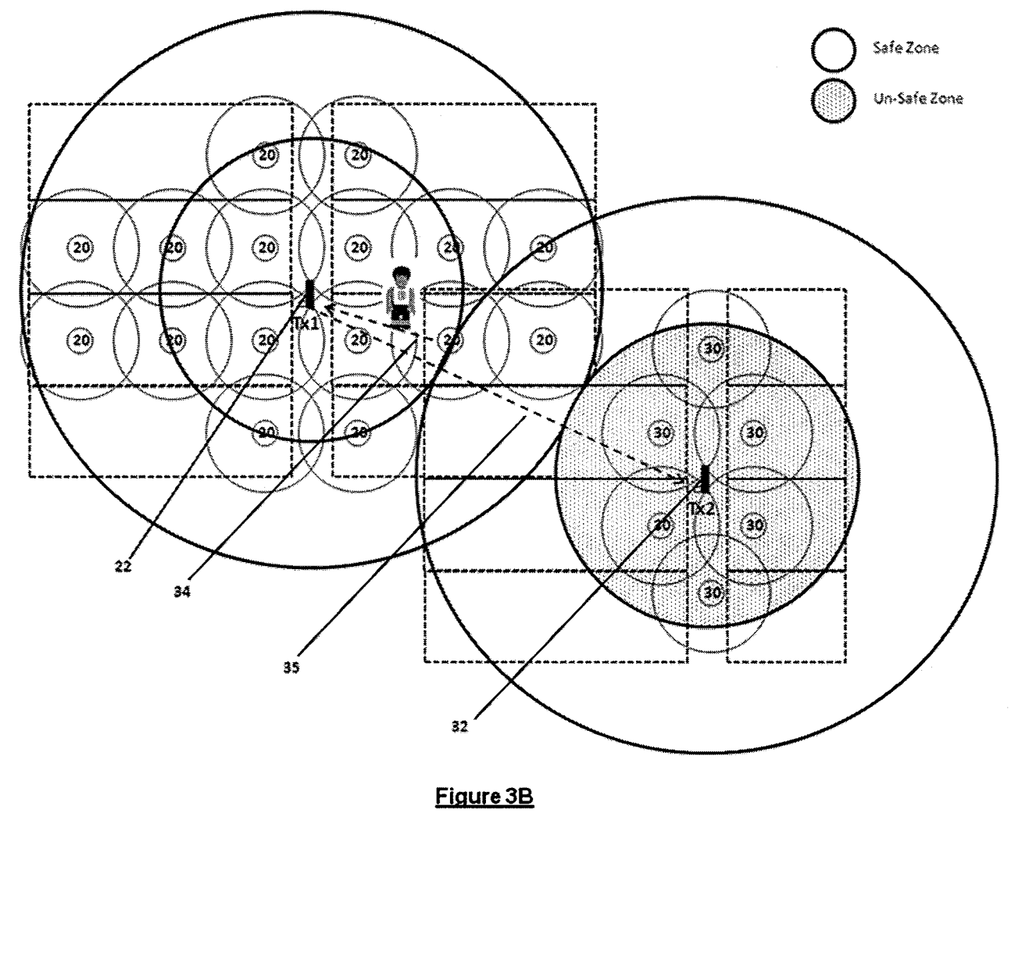
Figure 3C:
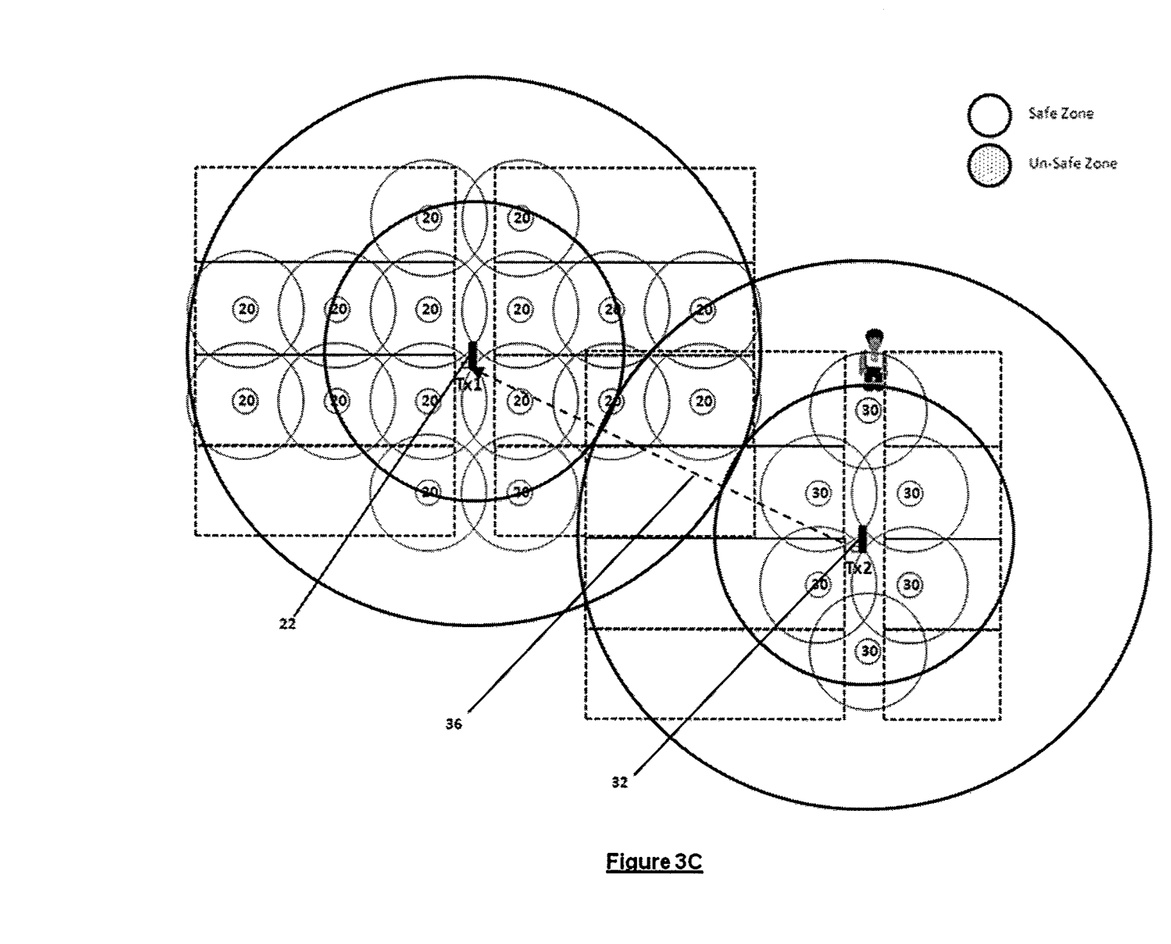
Figure 3D:
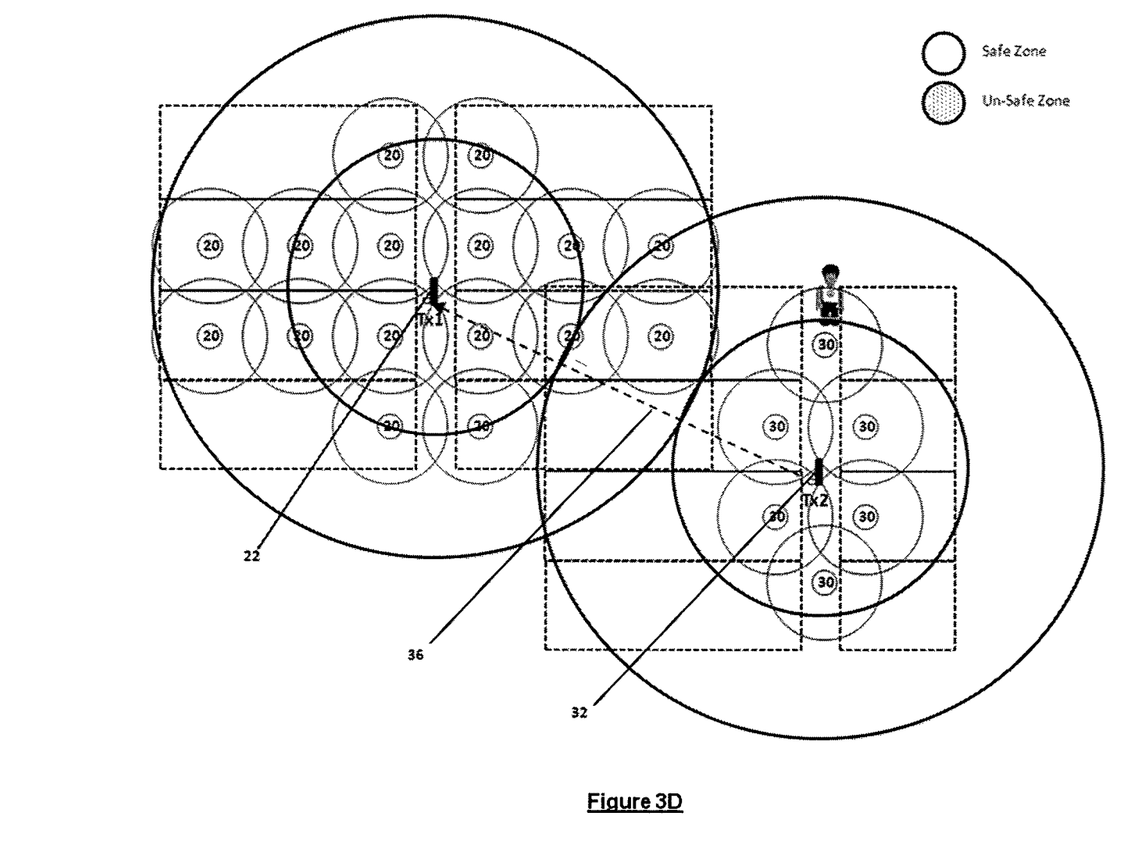

The transmitter of the first network (with Tx1 (22)) emits above maximum power, when a human being arrives (FIG. 3A). The presence is detected by the sensor and a signal is sent to the transmitter. The power level of transmitter I is reduced (FIG. 3B). Some time later the human being is walking towards the other end of the area spanned by the detector network I. This is signaled and it is communicated with the transmitter I (34). The transmitter I now sends a signal (35) to its neighboring network II to inform this network of an imminent approach of a human being (dotted line in FIG. 3B). The power level of transmitter II is reduced (FIG. 3C). As soon as the person is detected by a sensor of network II, this is signaled towards transmitter II (36). Knowing the setup and ranges of both networks, transmitter II is programmed to inform transmitter I that the human being is outside its range. Transmitter I resumes the original high power level (FIG. 3D).

Of course, this method of powering up several networks can be expanded to a multitude of transmitters, such that the transmitters themselves form a network. Since all these transmitters are connected to the mains, there is no real power limit for its radio: it does not have to be very energy efficient, contrary to the radio of the sensor.

In another embodiment, the sensors are only charged during periods when there is no presence at all like for example during the night or the weekend. Would a person be present, this will be detected and the charging can be stopped or resumed at a decreased intensity.

In an embodiment at least one of the detectors/sensors is a presence detector.

An advantage of the proposed approach is that since a larger power can be transmitted at certain times, the distance between sensor and transmitter can become larger, and thus less transmitters are needed. Furthermore, more energy can be captured by the sensor, thus increasing its functionality and decreasing the charging time of the sensor.

Furthermore, there is another practical advantage. For each transmitting device (e.g. an antenna), there exists a safety distance, which is in the order of decimeters. With the proposed solution one can assure that the device will not work when a human is present, so there is no need to put the device in a shielded environment.

Figure 4:
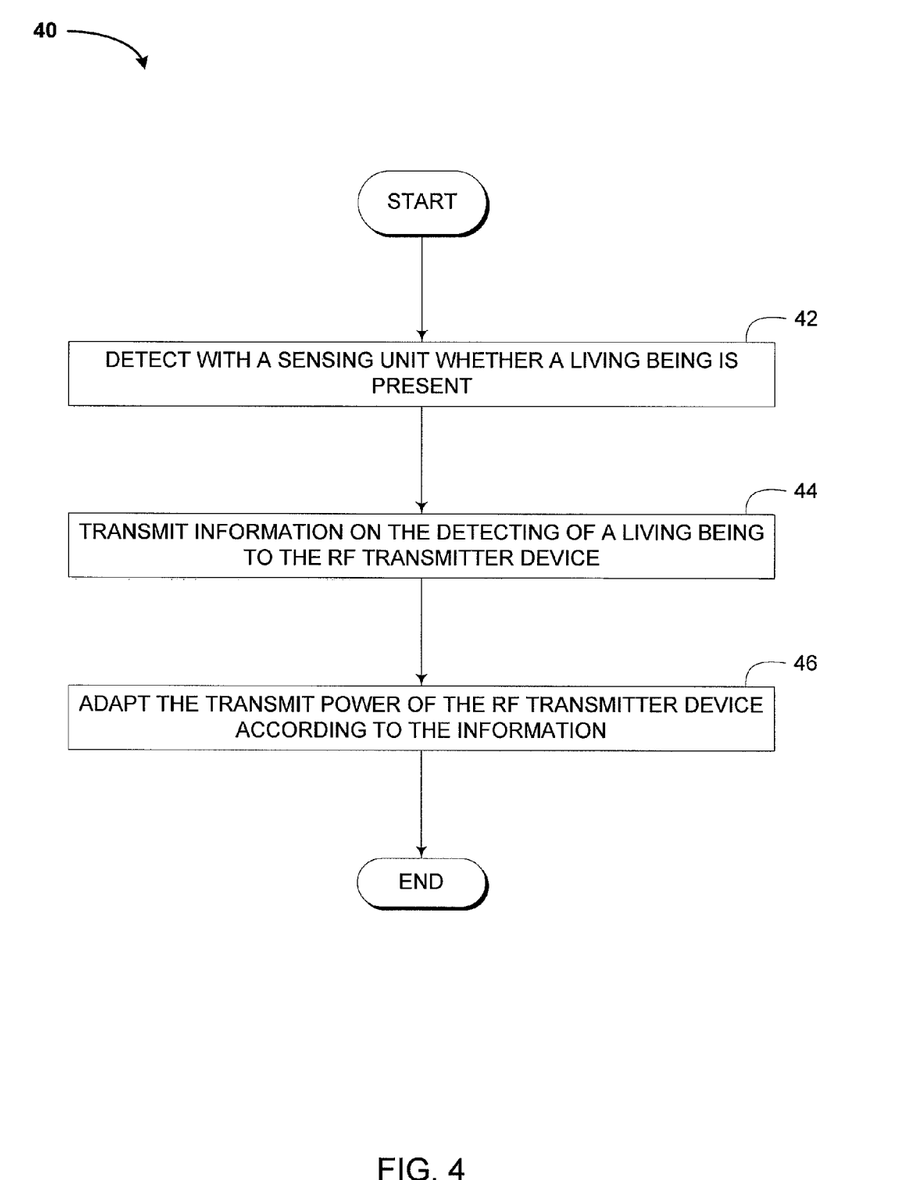
FIG. 4 is a flowchart of one embodiment of a method of adapting the transmit power of a RF transmitter device used for supplying RF energy to a plurality of sensing devices.

FIG. 4 shows a flowchart of one embodiment of a method of adapting the transmit power of a RF transmitter device used for supplying RF energy to a plurality of sensing devices. The method 40 starts at a block 42, wherein it is detected with a sensing unit whether a living being is present. Moving to a block 44, information on the detecting of a living being is transmitted to the RF transmitter device. Next at a block 46, the transmit power of the RF transmitter device is adapted according to the information.

Figure 5:
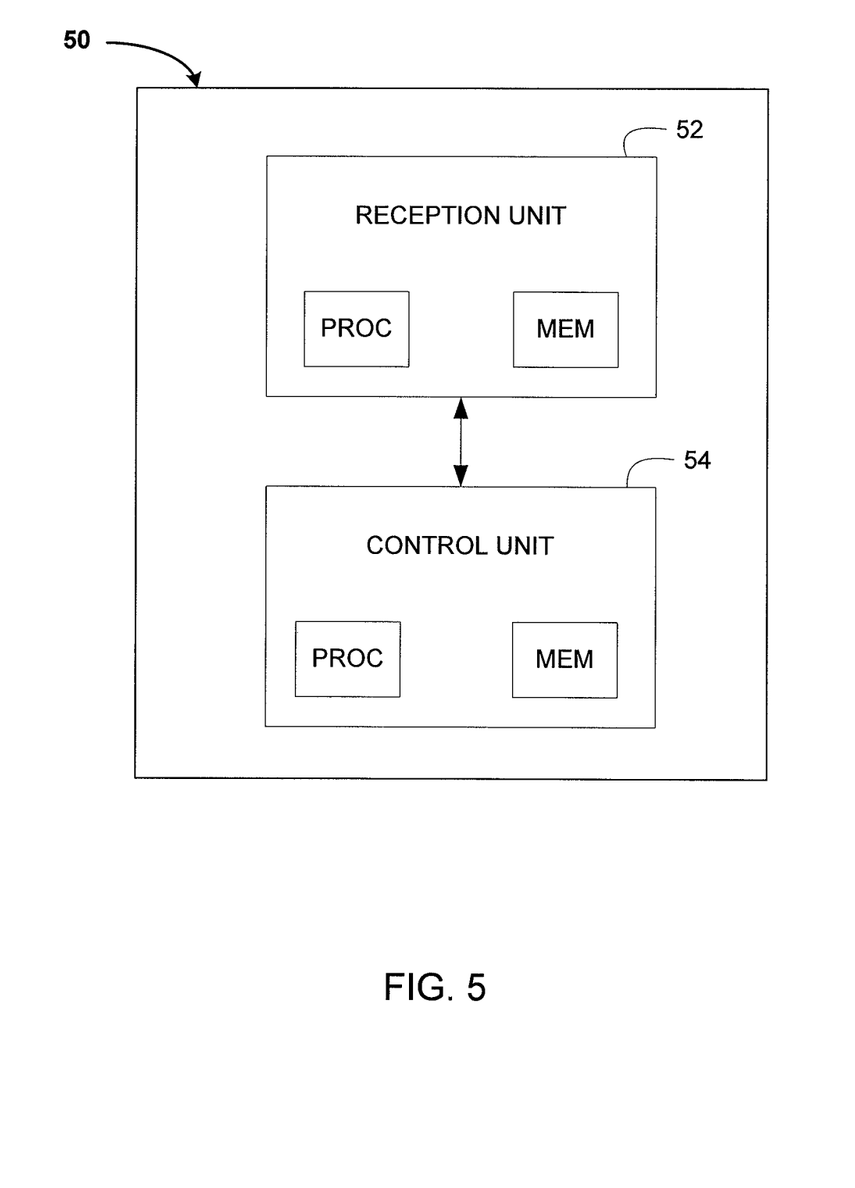
FIG. 5 is a block diagram illustrating one embodiment of a radio frequency (RF) transmitter device arranged for supplying energy by RF transmission.

FIG. 5 shows a block diagram illustrating one embodiment of a radio frequency (RF) transmitter device arranged for supplying energy by RF transmission. The transmitter device 50 comprises a reception unit 52 configured to receive information on a detected living being and a control unit 54 configured to adapt a transmit power of the transmitter according to the received information. Each unit may further comprise a processor and/or a memory.

Although systems and methods as disclosed, is embodied in the form of various discrete functional blocks, the system could equally well be embodied in an arrangement in which the functions of any one or more of those blocks or indeed, all of the functions thereof, are realized, for example, by one or more appropriately programmed processors or devices.

It is to be noted that the processor or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. Furthermore, aspects of the invention can be implemented in a computer program product stored in a computer-readable medium for execution by a programmable processor. Method steps of aspects of the invention may be performed by a programmable processor executing instructions to perform functions of those aspects of the invention, e.g., by operating on input data and generating output data. Accordingly, the embodiment includes a computer program product which provides the functionality of any of the methods described above when executed on a computing device. Further, the embodiment includes a data carrier such as for example a CD-ROM or a diskette which stores the computer product in a machine-readable form and which executes at least one of the methods described above when executed on a computing device.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to include any specific characteristics of the features or aspects of the invention with which that terminology is associated.

While the above-detailed description has shown, described, and pointed out novel features of the invention as applied to various embodiments, it will be understood that various omissions, substitutions, and changes in the form and details of the device or process illustrated may be made by those skilled in the art without departing from the scope of the re as defined by the appended claims.

What is claimed is:

1. A system comprising:
    a radio frequency (RF) transmitter device configured to supply energy by RF transmission within a given transmitter coverage area, to receive information about a detected living being, and to adapt a transmit power of the RF transmission according to the received information; and
    a plurality of sensor units, each sensor unit configured to detect living beings within a given sensor coverage area and to communicate with the RF transmitter providing information about an identity of the sensor unit and about a detected living being, the plurality of sensor units configured so that a living beings detection area covers an area overlapping the transmitter coverage area,
    wherein the RF transmitter is further configured to lower the transmit power of the RF transmission based on the sensor unit identity when detecting a living being.

2. The system of claim 1, wherein the living beings detection area is divided into a first detection area covered by a first plurality of sensor units and a second detection area covered by a second plurality of sensor units.

3. The system of claim 2, wherein the second detection area is closer to the RF transmitter than the first detection area.

4. The system of claim 2, wherein the RF transmitter is configured to lower the transmit power of the RF transmission to a given first power level within the first detection area when a sensor unit of the first plurality of sensor units detects the presence of a living being, and to transmit with a given second power level within the second detection area.

5. The system of claim 4, wherein the first power level is lower than the second power level.

6. The system of claim 4, wherein the living being is a human, the first power level is a level acceptable for human presence and the second power level is a level not acceptable for human presence.

7. The system of claim 4, wherein the RF transmitter is configured to further lower the second power level within the second detection area when a sensor unit of the second plurality of sensor units detects the presence of a human.

8. The system as of claim 1, wherein any of the sensor units is powered by the RF energy transmitted by the RF transmitter.

9. The system of claim 1, wherein at least one of the sensor units is configured to be powered by RF energy transmitted by the RF transmitter device.

10. The system of claim 1, wherein the RF transmitter is further configured to increase the transmit power of the RF transmission based on no detection of a living being.

11. A system comprising:
    two or more radio frequency (RF) transmitter devices, each configured to supply energy by RF transmission within a given transmitter coverage area, to receive information about a detected living being, and to adapt a transmit power of the RF transmission according to the received information; and
    each RF transmitter being associated to a plurality of sensor units, each sensor units configured to detect living beings within a given sensor coverage area and to communicate with the RF transmitter providing information about an identity of the sensor unit and about a detected living being, the plurality of sensor units configured so that a living beings detection area covers an area overlapping the associated transmitter coverage area,
    wherein the two or more RF transmitter devices are configured to share information between each other about a detected living being and wherein each RF transmitter is further configured to lower the transmit power of the RF transmission based on the sensor unit identity when detecting a living being.

12. The system of claim 11 wherein the living beings detection area in the area overlapping with each RF transmitter is divided into a first detection area covered by a first plurality of sensor units and a second detection area covered by a second plurality of sensor unit 13. The system of claim 12 wherein each RF transmitter is further configured to adapt the transmit power of the RF transmission in the first detection area and/or the second detection area based on the information received from a different RF transmitter.

14. The system of claim 13 wherein a first RF transmitter device increases the transmit power of the RF transmission in the first detection area and the second detection area when receiving information from a second RF transmitter device about a living being positioned outside the transmitter coverage area of the first RF transmitter device.

15. The system of claim 11 wherein the RF transmitters are further configured to share information between each other about their respective transmitter coverage areas.

* * * * *

UNITED STATES PATENT AND TRADEMARK OFFICE
CERTIFICATE OF CORRECTION

PATENT NO. : 8,447,238 B2  
APPLICATION NO. : 12/841929  
DATED : May 21, 2013  
INVENTOR(S) : Vullers et al.

Page 1 of 1

It is certified that error appears in the above-identified patent and that said Letters Patent is hereby corrected as shown below:

In the Claims

In column 8, line 30, in Claim 8, change "as of" to --of--.

In column 8, line 65, in Claim 12, change "unit" to --units.--.

Signed and Sealed this  
Tenth Day of December, 2013

Margaret A. Focarino  
*Commissioner for Patents of the United States Patent and Trademark Office*